3,244,746
PRODUCTION OF ACYL FLUORIDES BY REACTION OF AN ACYL CHLORIDE WITH A MIXTURE OF CaF₂ AND KCl
Franciszek Olstowski, Freeport, and John Donald Watson, Sr., Lake Jackson, Tex., assignors to The Dow Chemical Company, Midland, Mich., a corporation of Delaware
No Drawing. Filed July 17, 1962, Ser. No. 210,561
4 Claims. (Cl. 260—544)

This invention relates to a method for preparing acid fluorides and more particularly is concerned with an improved process for preparing organic acid fluorides from an organic acid chloride and calcium fluoride. The term acid fluoride as used herein is meant to include both completely fluorinated products as well as fluoro substituted products such as COClF, for example. The terms "organic acid chloride" or "acid chloride" as used herein are meant to include the acyl chlorides of aliphatic and aromatic organic acids, RCOCl, where R is an aliphatic or aromatic hydrocarbon or substituted hydrocarbon radical, as well as the carbonyl chloride derivatives of carbonic acid.

The reaction of calcium fluoride, i.e. fluorspar, with phosgene ($COCl_2$) to form fluorophosgene (COClF) is known in the art, U.S. Patent 2,757,214. However, in this process the amount of fluorine converted from $CaF_2$ into the acid fluoride is low, i.e. less than about 40 percent. It has been held in the art this low conversion of fluorine was the result of formation of a $CaCl_2$ film on the surface of the fluorspar reactant particles which surface film encompassed the $CaF_2$ particle and prevented further contact of the fluoride reactant with the phosgene.

Now, unexpectedly it has been found that high yields of acid fluorides markedly improved over that obtained by prior art methods can be produced by the present improved novel process. In accordance with this process, high yields of acid fluorides are obtained by reacting calcium fluoride and an organic acid chloride in the presence of potassium chloride. In this process, the $KCl/CaF_2$ molar ratio employed ranges from about 0.5 to about 3, but preferably is about 1.

The acid chlorides suitable for use in the instant process are the aliphatic and aromatic substituted and unsubstituted acyl chlorides and the carbonyl chloride derivatives of carbonic acid including, for example, $COCl_2$, HCOCl, $CH_3COCl$, $CCl_3COCl$, $C_6H_5COCl$, $C_3H_7COCl$, $C_6H_{13}COCl$, $C_6H_5CH_2Cl$ and the like. Ordinarily the process employs (1) aliphatic acyl chlorides RCOCl, wherein the aliphatic group R has a carbon chain length of about 1 to about 8, or (2) the acid chloride derivatives of carbonic acid. The process has been found to be particularly suitable for preparing acid fluorides from the acid chlorides of carbonic acid, i.e. phosgene ($COCl_2$) and HCOCl. In carrying out the process, either a single acid chloride or a mixture of the organic materials can be used.

Catalytic amounts of a substantially anhydrous reaction promoter such as an iron chloride, nickel chloride, an antimony chloride, a chromium chloride, hydrogen chloride, chlorine itself or mixtures thereof also can be used if desired in the present process. Conveniently, the metal chloride reaction promoter can be generated in situ in the reaction mass by using a mixture of finely divided metal and chlorine or hydrogen chloride.

In carrying out the present process, a mixture of $CaF_2$ and an acid chloride is placed in a suitable reactor along with a predetermined amount of potassium chloride as set forth hereinbefore, and, a reaction promoter catalyst, if desired. The ratio of $CaF_2$ to the acid chloride is not critical although ordinarily these reactants are employed at an organic acid chloride/$CaF_2$ ratio of from about 0.5 to about 2 or more.

The reaction mixture is subjected to a temperature of from about 150° C. to about 600° C. and preferably of from about 200 to about 550° C. at atmospheric or superatmospheric pressures up to 50 atmospheres or more for a period of time sufficient to react a predetermined quantity of the fluoride from the inorganic calcium fluoride with the acid chloride. Reaction times of from about 2 hours to about 70 hours or more have been found to be satisfactory. The reaction is not pressure dependent, but the reaction rate is increased by use of the superatmospheric pressures.

The materials of construction for the reactor vessels and allied process equipment are limited only in that they do not react detrimentally with the reactants or reaction products and have the physical characteristics and structural strength to stand up under the reaction temperatures and pressures employed. Stainless steel, nickel, stainless steel lined or nickel lined reactors are particularly suitable for use in the instant process.

The reaction is carried out in any of a wide variety of non-pressurizable and pressurizable stationary or rotatable reactor vessels as known to one skilled in the art. Ordinarily, a batch type operation is used. However, a continuous, cyclic or other type operation can be used.

Although we do not desire to be bound to any particular theory or reason for explaining the high results obtained by our instant process while film formation of $CaCl_2$ on the surface of the calcium fluoride reactant may offer some hindrance to completing the reaction, the ultimate limiting factor in reacting $CaF_2$ with acid chloride appears to be formation of the complex $CaF_2 \cdot CaCl_2$ (sometimes designated as CaFCl) material which ties up the inorganic fluoride so that it does not react with the acid chloride.

By incorporating KCl into the reaction mixture, as set forth hereinbefore, in accordance with the instant novel process, formation of the complex salt $CaCl_2 \cdot KCl$ has been noted. By tying up the $CaCl_2$ reaction by-product in this manner, undesirable $CaCl_2$ surface film formation on the surface of the $CaF_2$ reactant or the build up of a complex unreactive inorganic calcium chloride·calcium fluoride salt in the reaction mixture apparently is eliminated and the desired $CaF_2$-acid chloride reaction readily proceeds to give high yields of the acid fluoride.

Another advantage of the present process is that the $CaCl_2 \cdot KCl$ complex can be recovered and separated into its constituents by treatment with water. The KCl content can be leached from the solid complex and recrystallized for use in subsequent reaction.

The following examples will serve to illustrate further the improved process of the present invention but are not meant to limit it thereto.

EXAMPLE 1

A 1¼ inch inside diameter nickel reactor about 8 inches long was charged with a mix containing about 4 grams $CaF_2$ (~0.08 gram mole), about 7.7 grams of KCl (~0.1 gram mole) and about 14 grams of phosgene, i.e. carbonyl chloride $COCl_2$ (~0.14 gram mole). The reactor was heated to about 500° C. and pressurized to about 500 pounds per square inch gauge (~34 atmospheres) and maintained at these conditions for about 63 hours. Following this period the product gases were recovered. These upon analysis by infrared technique were shown to contain $COF_2$, COFCl and unreacted $COCl_2$.

The solid residue remaining in the reactor upon X-ray analysis was shown to contain $CaCl_2.KCl$ complex and unreacted KCl and $CaF_2$. No $CaF_2.CaCl_2$ complex was detected.

Elemental analysis of the solid residue by wet chemical methods indicated that approximately 79% of the $CaF_2$ charged was converted.

The process was repeated using the same reaction conditions and techniques as described hereinbefore except that the reaction time was reduced. A 24 hour run showed about 67 percent $CaF_2$ conversion. With the stationary reaction bed, a four hour reaction time gave a $CaF_2$ conversion of about 42%.

As a control, a binary mixture of about 4 grams of $CaF_2$ and 14 grams of $COCl_2$ were charged to the nickel reactor and reacted under the conditions described for the previous run (i.e. 500° C., 500 pounds per square inch gauge, and 63 hours). At the end of the test, the product gases upon infrared analysis were shown to contain $COF_2$, $COFCl$ and unreacted $COCl_2$.

The solid residues remaining after the reaction were shown by X-ray analysis to consist substantially of $$CaF_2 \cdot CaCl_2$$

complex and unreacted $CaF_2$. A wet chemical method of analysis of this residue indicated that approximately 35% of the $CaF_2$ was converted.

EXAMPLE 2

A ⅝ inch inside diameter by 30 inches long nickel tube was filled with a mixture of about 25 grams $CaF_2$ (~0.3 gram mole) and about 50 grams KCl (~0.7 gram mole). $COCl_2$ was passed through the tubular reactor at the rate of about 0.05 cubic foot per hour at atmospheric pressure the estimated residence time of the $COCl_2$ in the tube being in the order of from about 1 to several minutes. The $COCl_2$ was passed through the bed which was held at a given predetermined temperature and the exit gases analyzed to determine the product yield. The results of a number of runs made at a number of reactor temperatures are presented in Table I which follows:

Table I

| Run No. | Reactor Temp., °C. | Exit Gas Mixture, Volume Percent | | |
|---|---|---|---|---|
| | | $COCl_2$ | $COFCl$ | $COF_2$ |
| 1 | 110 | 97.6 | 2.4 | |
| 2 | 145 | 96.3 | 3.7 | |
| 3 | 175 | 92.7 | 7.3 | |
| 4 | 200 | 86.2 | 13.8 | Trace |
| 5 | 230 | 79.0 | 20.7 | 0.3 |
| 6 | 280 | 67.7 | 31.3 | 1.0 |
| 7 | 350 | 55.0 | 42.5 | 2.5 |

In a similar run, a mixture of CO and $Cl_2$ was passed through the reaction bed and yielded COFCl at a temperature of above about 200° C.

EXAMPLE 3

A reaction mix of the following composition was charged to the reactor described in Example 1:

| | Grams |
|---|---|
| $CaF_2$ | 4 |
| KCl | 7.7 |
| $COCl_2$ | 14 |
| Fe (powder) | 0.5 |
| $Cl_2$ | 1.5 |

The reactor was heated to about 500° C. and pressurized to about 500 pounds per square inch absolute and maintained at these conditions for about 64 hours. Following this period, the product gas mixture was recovered. This upon analysis was found to consist of the following components, on a volume percent:

| | Percent |
|---|---|
| COFCl | 66 |
| $COF_2$ | 2.8 |
| $COCl_2$ (reactant) | 31.2 |

The solid residue, upon X-ray analysis, was found to be substantially all $CaCl_2 \cdot KCl$ complex. No $CaF_2 \cdot CaCl_2$ complex was detected. Wet chemical analysis of the residues showed about 84% conversion of the $CaF_2$ charged.

In a manner similar to that described for the preceding examples HCOCl can be reacted with $CaF_2$ in the presence of KCl, employing about a 1 to 1 gram molar ratio equivalent of KCl to $CaF_2$ to prepare HCOF. Similarly, acetyl chloride can be reacted with a $KCl-CaF_2$ mixture as set forth herein to produce acetyl fluoride. Likewise, benzoyl chloride can be admixed with a $KCl-CaF_2$ mixture having a molar ratio of about 0.2 to produce benzoyl fluoride. Similarly, benzyl chloride can be converted into benzyl fluoride by the instant process. Likewise, caproyl chloride can be converted into caproyl fluoride.

Various modifications can be made in the present invention without departing from the spirit or scope thereof for it is understood that we limit ourselves only as defined in the appended claims.

We claim:

1. A process for preparing organic acid fluorides which comprises: reacting an organic acyl chloride selected from the group consisting of $COCl_2$, HCOCl and mixtures thereof with a mixture of potassium chloride and calcium fluoride at a temperature of from about 150 to about 600° C., the molar ratio of said KCl to said $CaF_2$ ranging from about 0.5 to about 3 and the molar ratio of said $CaF_2$ to said organic acyl chloride ranging from about 0.5 to about 2, and recovering the corresponding acyl fluoride from the reaction mixture.

2. The process as defined in claim 1 wherein a catalytic amount of a substantially anhydrous reaction promoter selected from the group consisting of an iron chloride, nickel chloride, an antimony chloride, a chromium chloride, hydrogen chloride, chlorine and mixtures thereof is included into the reaction mixture.

3. A process for preparing carbonyl fluorides which comprises:
(1) providing a reaction mixture of calcium fluoride, potassium chloride and carbonyl chloride, said mixture having a gram molar ratio of KCl to $CaF_2$ of about 2 and a phosgene to $CaF_2$ ratio of about 2,
(2) heating said mixture at about 500° C. at a pressure of about 500 pounds per square inch gauge for a period of at least 24 hours, and,
(3) recovering carbonyl fluoride and carbonyl chloro fluoride therefrom.

4. The process as defined in claim 3 wherein a mixture of powdered iron and chlorine reaction promoter was incorporated into the reaction mass.

References Cited by the Examiner

UNITED STATES PATENTS 2,757,214   7/1956   Muetterties _____ 260—544 X
2,836,622   5/1958   Tullock _____ 260—544

OTHER REFERENCES

Krauze et al.: "Chem. Abstracts," vol. 37, pp. 1644–1645 (1943); QD1.A51.

LORRAINE A. WEINBERGER, *Primary Examiner.*

LEON ZITVER, *Examiner.*